United States Patent [19]

Stutzman

[11] Patent Number: 5,547,045
[45] Date of Patent: Aug. 20, 1996

[54] ADJUSTABLE WHEEL CHOCKS FOR TANDEM WHEELED VEHICLES

[76] Inventor: Jay Stutzman, 1010 Eisenhower Dr. S., Goshen, Ind. 46526-5395

[21] Appl. No.: 420,031

[22] Filed: Apr. 11, 1995

[51] Int. Cl.⁶ ..................................... B60T 1/04
[52] U.S. Cl. ............................. 188/2 R; 188/74
[58] Field of Search ..................... 188/2 R, 4 R, 188/32, 74; 410/12, 30, 49; D12/217

[56] References Cited

U.S. PATENT DOCUMENTS 3,548,975 12/1970 Herndon ........................... 188/74
4,369,009 1/1983 Fulford ........................... 410/12 X
4,694,936 9/1987 Jackson ........................... 188/74
4,786,223 11/1988 Crissy et al. ..................... 188/32
5,158,158 10/1992 Balogh et al. ................... 188/74 X Primary Examiner—Robert J. Oberleitner
Assistant Examiner—Kevin D. Rutherford
Attorney, Agent, or Firm—Baker & Daniels

[57] ABSTRACT

An adjustable wheel chock mechanism for use on tandem axle vehicles that includes an adjustable wheel chock to accommodate vehicles with larger or smaller spacing between the tandem axles. The wheel chocks are comprised of a rigid quadrilateral frame which allows the use of a single rotating spindle and eliminates the need for additional hardware to construct each separate wheel chock. The present device also includes a removable crank to provide additional theft deterrence.

3 Claims, 4 Drawing Sheets

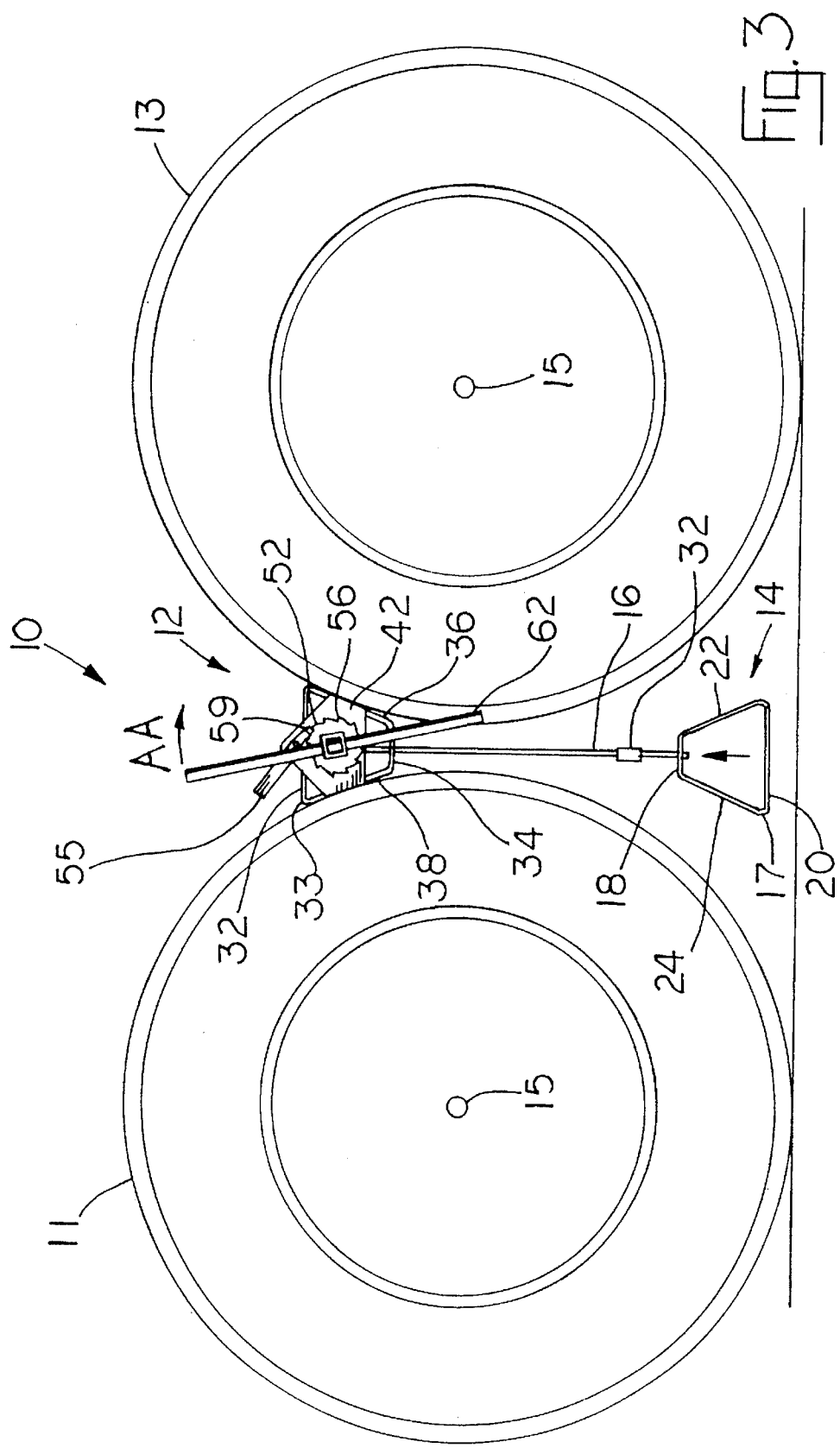

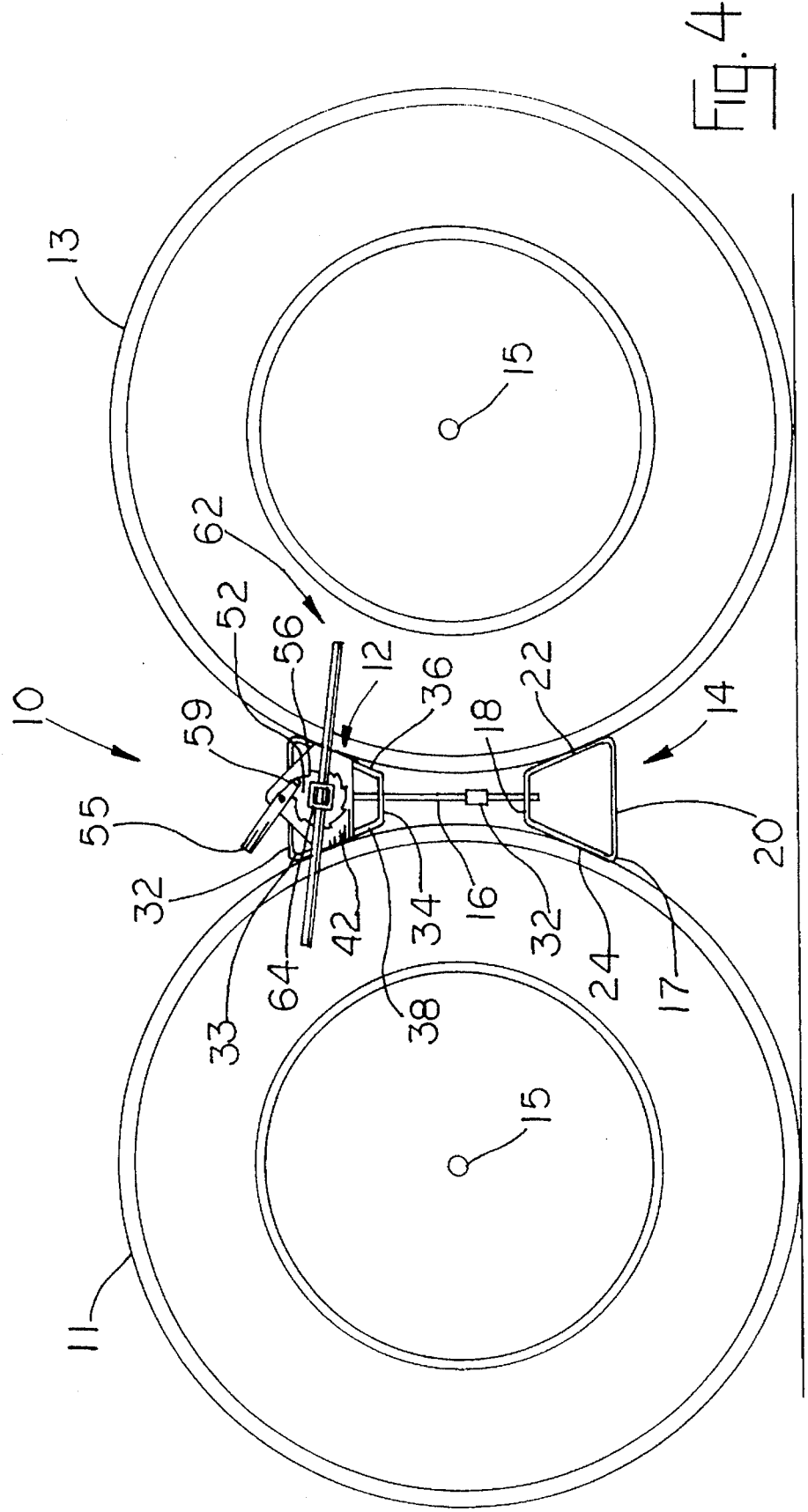

5,547,045

ADJUSTABLE WHEEL CHOCKS FOR TANDEM WHEELED VEHICLES

BACKGROUND OF THE INVENTION

The present invention relates generally to wheel chocks for tandem wheeled vehicles.

When tandem wheeled vehicles such as semi-trailers or recreational vehicles are parked, they are subject to rolling if the ground is not perfectly level, the contents are not secured, or if the occupants move about. Further, vehicles of this type are frequently the target of thieves, because such vehicles can simply be towed away if not otherwise secured. Tandem wheeled vehicles generally have wheels on each side of the vehicle where the rear portion of the front tire and the front portion of the rear tire are in generally close proximity. Therefore, the placement of wedge shaped members between the tires in a frictional manner serves to prevent the rotation of the tires and hence any movement of the vehicle over the ground is greatly inhibited.

The use of wedge shaped wheel chocks is generally known in the prior art. One such prior art device is shown in U.S. Pat. No. 5,158,158. The advantage of the present invention over the above patent is the use of an entirely different chock construction, a different means of connecting the chocks to each other, and a theft deterrent handle that renders the device inoperable.

SUMMARY OF THE INVENTION

The present invention eliminates the problem of bulky, difficult to handle wheel chock devices by providing a lighter more maneuverable wheel chock construction and by eliminating many of the component parts of prior devices. The simplification and improvement of the chock design as well as the elimination of many parts provides a device that is much less labor intensive to construct and hence less expensive overall. A device so constructed can be used on vehicles with varying wheel sizes and axle spacings. Moreover, the theft deterrent aspect is enhanced through the use of a demountable crank on the winch mechanism.

Accordingly, it is an object of this invention to provide a novel and improved adjustable wheel chock device.

Another object of the invention is to provide a wheel chock device that allows users to more easily manipulate and install the device on a tandem wheeled vehicle.

Another object of the invention is to provide a wheel chock device that incorporates a lighter chock construction with fewer component parts.

Still another object of the invention is to provide theft deterrence by using a detachable crank on the wheel chock device.

Other objects of the invention will become readily apparent to those skilled in the art upon a reading of the following description.

BRIEF DESCRIPTION OF THE DRAWINGS

FIG. 3 is an elevational view of the adjustable wheel chock device illustrated in FIGS. 1 and 2 showing the manner of operation of the device.

FIG. 4 is an elevational view of the adjustable wheel chock device illustrated in FIGS. 1, 2, and 3 showing the device in a locked position.

FIG. 5 is a perspective view of the adjustable wheel chock device showing an alternate embodiment for the wheel chock construction to allow the use of the device on vehicles with a larger spacing between ales.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to best enable others skilled in the art to follow its teachings.

Figure 1:
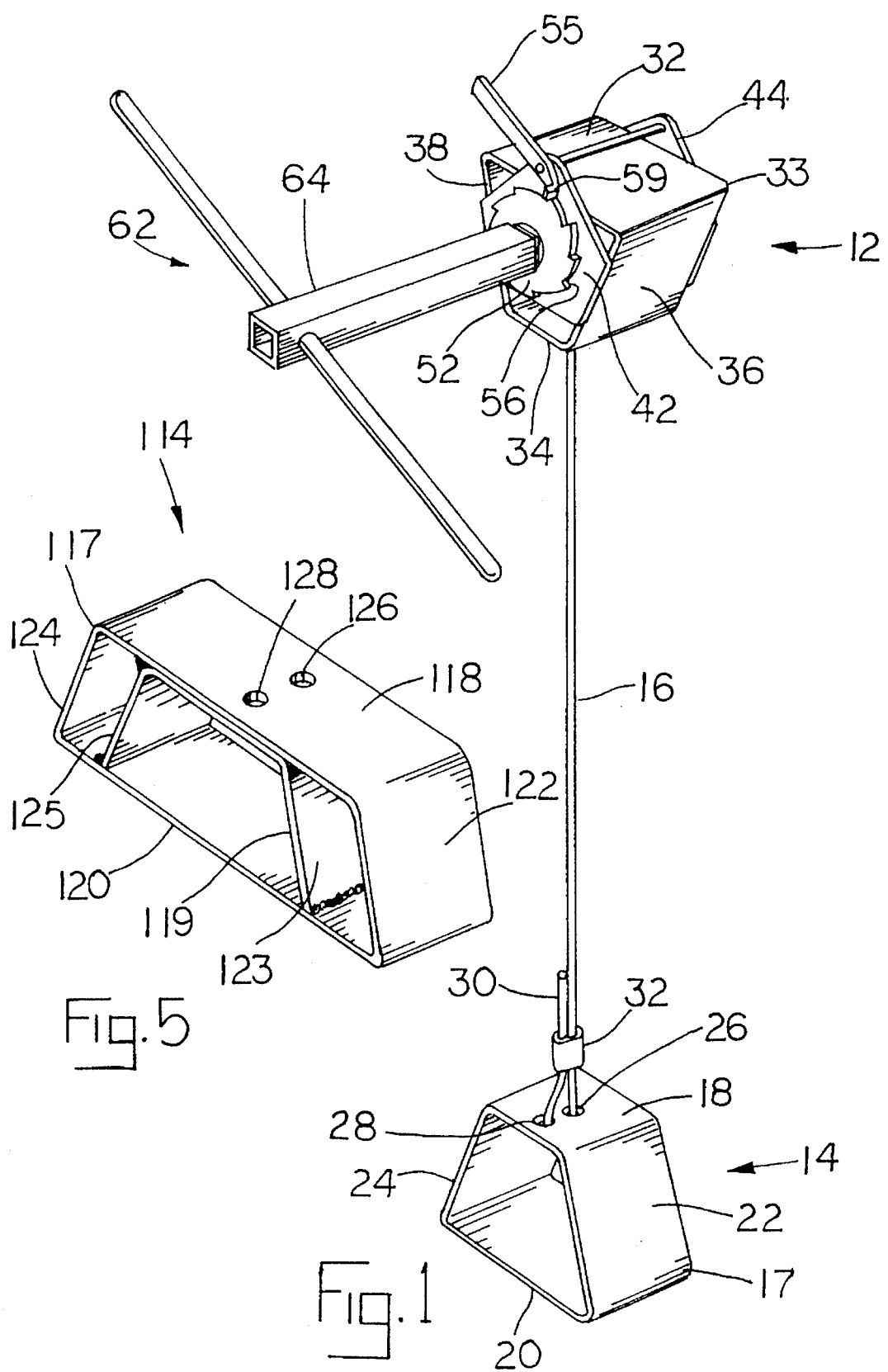
FIG. 1 is a perspective view of an adjustable wheel chock device.
Figure 2:
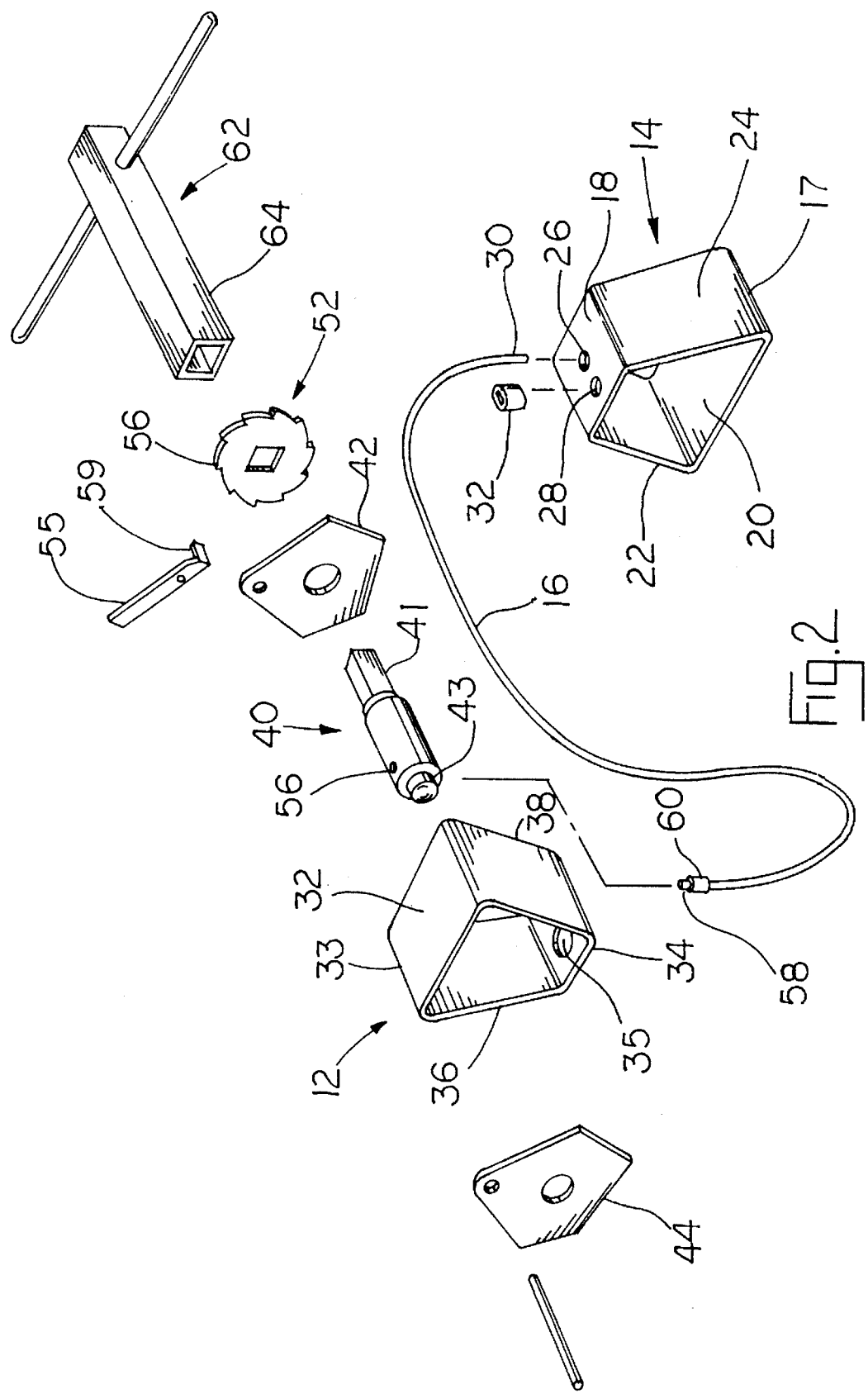
FIG. 2 is a an exploded view in perspective of the adjustable wheel chock device illustrated in FIG. 1 showing the manner of construction of the device.

Referring now to the drawings, FIG. 1 shows the present wheel chock device generally indicated by the reference numeral 10 attached to a tandem wheel arrangement as shown in FIG. 4 comprised of a front wheel 11 and a rear wheel 13 mounted on a pair of axles 15. The wheel chock device includes an upper chock 12 and a lower chock 14 constructed of a rigid material. Upper chock 12 and lower chock 14 are connected by flexible cable 16, which extends therebetween. Flexible cable 16 is constructed of woven steel strands or any similar non-extensible material having both flexibility and a high tensile strength. Lower chock 14 is a continuous tubular housing 17. Tubular housing 17 includes top end 18 and bottom end 20, and a pair of inclined surfaces 22 and 24. The pair of inclined surfaces 22 and 24 generally converge towards each other so that the inclined surfaces 22 and 24 of lower chock 14 may engage corresponding inclined surfaces of tandem wheels 11, 13. Top end 18 defines a pair of holes 26 and 28 through which fixed end 30 of flexible cable 16 is threaded. Fixed end 30 threads through holes 26 and 28 and doubles back so that fixed end 30 can be securely connected to the remainder of flexible cable 16 by frictional clamp 32.

Upper chock 12 is constructed from continuous tubular housing 33, and includes top end 32 and bottom end 34, and a pair of inclined surfaces 36 and 38. Bottom end 34 includes an aperture 35. Inclined surfaces 36 and 38 converge towards each other so that the inclined surfaces 36 and 38 of upper chock 12 may engage corresponding inclined surfaces of tandem wheels 11, 13. Spindle 40 is rotatably mounted within tubular housing 33 of upper chock 12 and is supported by first and second journal plates 42 and 44, so that spindle 40 is free to rotate. First and second journal plates 42 and 44 are welded or otherwise affixed to the edges of tubular housing 33 in a spaced parallel relationship. Spindle 40 includes first and second ends 41 and 43.

Ratchet wheel 52 is welded or otherwise affixed to the first end 41 of spindle 40 at a position adjacent to ratchet lever 55. Ratchet lever 55 is pivotally mounted to the first journal plate 42, and includes a pawl end 59 which engages teeth 56 of ratchet wheel 52. Spindle 40 includes a transverse aperture 50 that extends therethrough. Spool end 58 of flexible cable 16 passes through aperture 35 in bottom end 34 of upper chock 12 and extends through passage 56 of spindle 40. Spool end 58 is secured to spindle 40 by frictional clamp 60.

Crank assembly 62 removably engages end 41 of spindle 40 for rotating the latter. Crank 62 includes square tubular shank portion 64 which is sized to receive end 41 of spindle 40, so that rotation of crank assembly 62 in turn rotates spindle 40. End 41 of spindle 40 is square and sized to accommodate square tubular shank portion 64 of crank assembly 62.

FIG. 5 illustrates a second embodiment of the claimed invention, in which elements that are the same or substantially the same as those in the embodiment of FIGS. 1–4 retain the same reference characters, but increased by 100. Lower chock 114 is constructed from first and second tubular housings 117 and 119 having different horizontal dimensions. First and second tubular housings 117 and 119 are welded or otherwise affixed to each other so that top end 118 and bottom end 120 are common to both housings. Tubular housing 117 includes a pair of inclined surfaces 122 and 123 on one side thereof and another pair of inclined surfaces 124 and 125 on the other side thereof. Inclined surfaces 122 and 123 are positioned in a spaced apart parallel relationship, and inclined surfaces 124 and 125 are positioned in a spaced apart parallel relationship. Inclined surfaces 122, 123 generally converge toward inclined surfaces 124, 125. Top end 118 defines a pair of holes 126 and 128 through which fixed end 130 of flexible cable 116 is threaded. Fixed end 130 threads through holes 126 and 128 and doubles back so that fixed end 130 can be securely connected to the remainder of flexible cable 116 by frictional clamp 132. Inclined surfaces 123 and 125 stiffen top end 118 and bottom end 120, as well as corresponding inclined surfaces 122 and 124. In this embodiment, the wheel chock device can be used on vehicles with varying wheel sizes and larger axle spacings. Preferably, both the upper and lower chocks should be enlarged in a similar manner. However, in some applications it may only be necessary to enlarge one of the chocks, depending on the overall spacing between the axles.

In operation, the upper chock assembly 12 is positioned as shown in FIG. 3 so that the pair of inclined surfaces 36 and 38 of upper chock 12 engage the outer circumference of tandem wheels 11 and 13 at a point above the axles. The angular rotation of crank assembly 62 in the direction shown generally by reference arrow AA results in the rotation of spindle 40 so that flexible cable 16 is wound upon spindle 40. As the crank assembly 62 and spindle 40 are rotated, pawl 59 of ratchet lever 55 engages successive teeth 56 on ratchet wheel 52, which thereby prevents rotation of spindle 40 in the opposite direction, unless ratchet lever 55 is actuated to disengage pawl 59 from teeth 56. At the same time, lower chock 14 is drawn in an upward direction until the inclined surfaces of lower chock 14 engage the outer circumference of tandem wheels 11 and 13 at a point below the axles. As rotation of the crank assembly 62 continues, the frictional force between the inclined surfaces of both chock members and the outer circumference of tandem wheels 11 and 13 is increased, thereby providing increased rotational resistance to the wheels.

As shown in FIG. 4, when flexible cable 16 is sufficiently wound upon spindle 40, upper chock 12 and lower chock 14 are positioned in frictional engagement between the circumferential surfaces of tandem wheels 11 and 13 at positions above and below the axles, respectively. Thus, wheels 11 and 13 are unable to rotate, and any movement of the tandem axled vehicle relative to the supporting surface is prevented. Crank assembly 62 is then disengaged from spindle 40 and stored for later use.

It is understood that the above description does not limit the invention to the above-given details, but may be modified within the scope of the following claims.

I claim:

1. Adjustable wheel chock mechanism for tandem axle vehicles comprising a pair of chock members, each of said chock members including a tubular housing having a pair of ends and an outer wall extending continuously between said ends, the wall of each of said housings having a pair of inclined surfaces extending continuously across the width of said housing between said ends and tapering toward one another and facing the inclined surfaces on the other chock member, one of the inclined surfaces on each of the chock members engaging the tread of a corresponding one of a pair of tandem wheels, the other inclined surface on each chock member engaging the tread of the other tandem wheel whereby each of the inclined surfaces engages its corresponding wheel across all of that portion of the width of said housings disposed between said wheels, a cable extending between said chock members and secured to one of the chock members, substantially horizontal ratchet means carried by one of the housings for winding said cable on the rachet means for drawing said chock members toward one another, at least one of said tubular housings further including an inner wall extending continuously between said ends, said inner wall having a pair of second inclined surfaces extending continuously across the width of said housing between said ends, said second inclined surfaces being spaced apart from and parallel to said first mentioned inclined surfaces for accommodating vehicles with varying spacing between said tandem axles.

2. Adjustable wheel chock mechanism as claimed in claim 1, wherein said ratchet means includes a spindle rotatably mounted in the housing of the other chock member for winding said cable onto said spindle for drawing said chock members toward one another, a crank for rotating said spindle, and connecting means for joining said crank to said spindle, said connecting means including a releasable coupling that releases to permit removal of the crank from the spindle.

3. Adjustable wheel chock mechanism for tandem axle vehicles comprising a pair of chock members, each of said chock members including a tubular housing having a pair of ends and an outer wall extending continuously between said ends, the wall of each of said housings having a pair of inclined surfaces extending continuously across the width of said housing between said ends and tapering toward one another and facing the inclined surfaces on the other chock member, one of the inclined surfaces on each of the chock members engaging the tread of a corresponding one of a pair of tandem wheels, the other inclined surface on each chock member engaging the tread of the other tandem wheel whereby each of the inclined surfaces engages its corresponding wheel across all of that portion of the width of said housings disposed between said wheels, a cable extending between said chock members and secured to one of the chock members, and ratchet means mounted to the other chock member for drawing said chock members toward one another, said ratchet means including a rotatable spindle mounted within said housing for winding said cable, said spindle supported by first and second journal plates mounted to said housing, said housing on said other chock member further including a guide hole for guiding said cable onto said spindle, wherein said cable extends through said hole towards said one chock member, a ratchet wheel carried by said spindle for preventing said cable from unwinding from said spindle, and a pivot pin extending between said first and second journal plates, said pivot pin having a lever connected thereto rotatable about said pivot pin, said lever for engaging said rachet wheel.

* * * * *